Oct. 7, 1952
H. E. HAYNES
2,613,264
IMAGE RECORDING APPARATUS
Filed Nov. 4, 1949
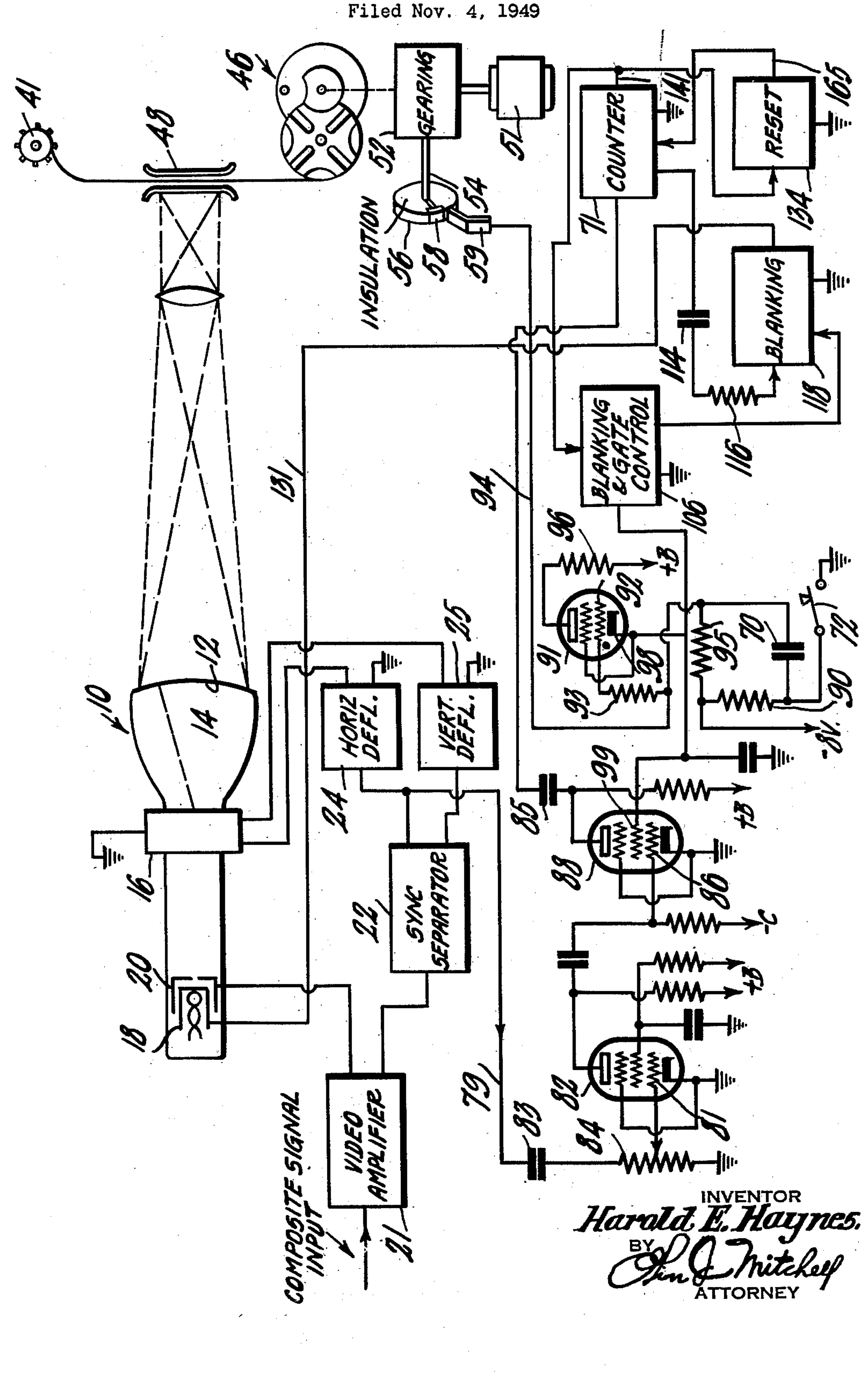
INVENTOR
Harald E. Haynes.
BY
ATTORNEY Patented Oct. 7, 1952 2,613,264

UNITED STATES PATENT OFFICE 2,613,264

IMAGE RECORDING APPARATUS

Harold E. Haynes, Audubon, N. J., assignor to Radio Corporation of America, a corporation of Delaware Application November 4, 1949, Serial No. 125,538

1 Claim. (Cl. 178—7.4)

The present invention relates to the photographic recording of images, and more particularly, although not necessarily exclusively, to a novel arrangement for controlling apparatus for photographically recording recurring images produced by television methods whereby a single image record may be obtained at will.

It is desirable to record images of transmitted television programs for future use as program material, as well as for preservation to serve as a record of transmitted subject matter. It is also desirable conveniently to obtain a record of a single image frame for test purposes or the like.

In applicant's copending application, Serial No. 114,420, filed September 7, 1949 there is disclosed a system for keying a television image on and off at precisely controlled instants relative to the vertical and horizontal deflections of the cathode ray beam of an image producing cathode ray tube by employment of electronic counting apparatus which is interlocked in operation with the rate of production of television images. The mechanism of the camera used for recording purposes serves to move the film at intervals and to provide a non-critically timed initiating pluse.

In accordance with the present invention, an arrangement is provided for operating the recording apparatus in such a manner that only a single image is produced by the cathode ray tube while a single film frame is maintained in position for exposure. One important feature of the apparatus embodying the present invention is that means are incorporated for preventing recurrence of the operating cycle of the electronic controlling mechanism which would spoil the record of the single image to be taken for test purposes.

The principal aim of the present invention is to provide novel control apparatus for obtaining a single film frame recording by apparatus which normally functions cyclically to provide a sequence of image recordings.

Another object is to provide a novel switching arrangement for controlling image recording apparatus or the like.

A further object is to provide a novel bias control for momentarily changing the bias voltage applied to a control element of an electronic device, or the like.

Other objects and advantages of the present invention will, of course, become apparent and immediately suggest themselves to those skilled in the art to which the invention is directed from a reading of the following specification in connection with the accompanying drawing in which the single figure shows, diagrammatically, apparatus for obtaining a continuous photographic record of television images with the novel arrangement of the present invention included therein.

Referring to the drawing, reference character 10 indicates a television image producing device, shown illustratively as a cathode ray tube, upon the target end 12 of which television images are produced by the impingement of a deflected scanning beam 14. Beam deflecting means including deflection yoke 16 cause the image modulated beam 14 to be swept over the tube end 12 along spaced scanning lines. In accordance with the usual practice, alternate lines are traced by each complete sweep of the beam 14.

The electrode structure of the tube 10 includes a cathode 18 and a grid 20. Image signals are applied to the grid 20 in the usual manner from a video amplifier 21. Composite video and sync signals, such as are obtained from the second detector of a television receiver (not shown), are applied to the video amplifier and to a sync separator 22. The output of the sync separator is employed to control horizontal and vertical deflection generators 24 and 25. The foregoing is the usual arrangement in television receivers having a cathode ray tube serving as an image producing device and is readily adapted for recording purposes in accordance with the invention disclosed in the above mentioned copending application.

The images to be recorded are photographed on a film strip 41 by a camera comprising an intermittent mechanism 46 which pulls the film through the film gate 48 at the rate, for example, of twenty-four film frames per second. The intermittent mechanism 46 may, for example, be driven by a motor 51 which is of the type operating at substantially constant speed. Gearing 52, which is indicated conventionally, is provided to suit the speed of operation of the intermittent mechanism 46 to the normal speed of the motor 51. A shaft 54 is driven from the gearing 52 so that it rotates in synchronism with operation of the pull-down mechanism 46. When the pull-down mechanism has operated to advance the film 41 to a new frame position, a commutator 56 of insulating material having a conductive segment 58 closes an electrical circuit including a slide contact or brush 59.

Generally, in operation of the arrangement shown by Fig 1 it is required that one complete television image be photographed upon each motion picture film frame. It is further required that the motion picture film frame frequency be standard when the linear velocity is normal so that the correct speed of action is reproduced when the film is run through a standard motion picture projector at normal speed. The television frame frequency may be, and usually is, different from the standard motion picture frame frequency. Furthermore, the time interval between television frames is much shorter than that required for the pull-down of the motion picture film from one frame to the next.

An electronic counter 71, which may comprise a number of multivibrators or "flip-flop" circuits, is shown in block form since a detailed disclosure of its operation is not necessary for an understanding of the present invention.

The control section of the apparatus includes a normally open key or switch 72 which is to be operated to obtain photographic exposure, in accordance with the present invention, of a single frame only of the television images being produced by the tube 10. The function of the switch 72 and its associated circuits will be described more in detail hereinafter. Horizontal sync signals, which occur at the rate of 15,750 per second in accordance with present day practice, are obtained in the illustrative example from the sync separator 22 and are applied over a conductor 79 to the control grid 81 of an amplifier tube 82 by way of a coupling condenser 83 and a potentiometer 84. The output of the tube 82 is coupled to the grid 86 of a "gating" amplifier tube 88. The anode of the gating amplifier is connected to the counter 71 by way of a condenser 85. The gating effect of the gating amplifier is controlled by means of a tube 91, which may be a gas discharge tube of the 2D21 type. The signal grid 92 of the tube 91 is connected through a resistor 93 to the contact brush 59 by way of a conductor 94. A connection is also made through a resistor 95 to a source (not shown) of negative potential. This source is or may be connected, in a conventional manner to a circuit reference point such as ground. One contact, for example, the movable contact, of the switch 72 is connected through a resistor 90 to the end of the resistor 95 opposite the grid of the tube 91. A condenser 70 is connected between the movable contact of the switch 72 and the end of the resistor nearest the grid 92. The remaining contact of the switch 72 is grounded. It will be noted that the source (not shown) of D. C. voltage is effectively in series circuit which includes the switch 72, the condenser 70 and the resistor 95. When the switch is closed, the voltage of the source appears across the series combination of condenser 70 and resistor 95, and a charging current flow. However, at the instant the charging current commences, the end of the resistor 95 nearest the grid is more positive than with the switch open and the condenser discharged. As the condenser becomes charged, the charging current substantially ceases and since no current then flows in resistor 95, the grid 92 is maintained negative. After the switch is opened, the condenser discharges through resistors 90 and 95.

The plate of the tube 91 is connected through a resistor 96 to a positive source (not shown) of anode voltage. Its cathode 98 is connected to the screen grid 99 of the tube 88.

The discharge path of the tube 91 is completed to ground through a blanking and gating control 106 which provides a conductive path except after completion of a counting operation by the counter 72.

Closure of the contacts 58 and 59 causes the tube 91 to become conductive, as indicated above, applying sufficient screen grid voltage to gating amplifier 88 to cause it to transmit horizontal sync pulses, which causes the counter 71 to operate. An initial multivibrator stage (not shown) of the counter provides a change in voltage in the positive direction which is applied through a condenser 114 and a resistor 116 to a blanking device 118. The blanking device 118 functions as a source of cathode blanking bias for the cathode ray tube 10 which is supplied over a conductor 131 to the cathode 18 of the cathode ray tube 10. Blanking bias is removed from the tube 10 at this time.

When the count is completed the voltage in a conductor 141 rises in a positive direction which causes operation of the reset device 134. A conductor 165 provides a resetting voltage from the reset device 134 to the counter 71.

The conductor 141 is also connected to the blanking and gating control device 106. This device may be electronic in nature and serves to open the circuit of the gas discharge tube 91 and also to cause the blanking device 118 to blank the beam in the tube 10. The device 106 may comprise one or more vacuum tubes (not shown) which may be rendered non-conductive.

The system described above, in sufficient detail to form a setting for the present invention, operates under control of the commutator 56 to record two television fields on each film frame. Each film exposure period includes exactly 525 lines as determined by the counter 71. This splice on alternate film frames between the beginning of exposure of a film frame from one television frame and the end of exposure from the next television frame is precisely obtained so that scanning lines are neither lost nor duplicated.

It is essential when obtaining exposure of a single frame for test or other purposes to limit operation of the apparatus to only one exposure cycle. If a second exposure cycle is initiated, the test exposure is worthless since the film is not advanced to a new area as it would be with the system operating to produce successive exposures under control of the commutator 56. In normal operation the contacts 58 and 59 are connected together once for each pull down cycle of the camera, and reopened before the end of exposure for that frame.

For the present single-frame exposure purposes, the above described resistor 95 and condenser 70 cooperate in their connection to the grid 92 of tube 91 to insure against accidental recycling of the equipment.

Operation of the switch 72 and its associated elements to provide a single frame record in accordance with the present invention will now be described.

With the switch 72 open, the grid 92 of the tube 91 is biased negatively thereby preventing firing of this tube. The condenser 70 has been discharged through the resistors 90 and 95 and both of its terminals are hence at $-8V1$, the bias-supply potential. When the switch 72 is closed, the potential at the terminal of the condenser 70 connected to the resistor 90 is raised in the positive direction from the negative value corresponding to the negative bias applied to the grid 92, to ground or zero potential. Assuming, by way of example that the end of the resistor 95 opposite to the resistor 93 and the grid 92 is connected to −8 volts as indicated on the drawing, a positive-going pulse of eight volts is thus fed through the condenser 70 to grid 92 to fire the tube 91. At the end of a period of time, determined by the counter 71, the tube 91 is extinguished by the blanking and gating control device 106. This period of time is 1/30 second, assuming operation of the tube 10 in accordance with present day television standards. The tube 91 does not refire since by this time the condenser 70 has charged through resistor 95 to substantially 8 volts, in the illustrative example, even if the switch 72 is still closed. Consequently the tube 91 cannot be fired again until the switch 72 is opened long enough to permit the condenser 70 to discharge.

The values of the resistors 90 and 95 and the condenser 70 are not critical. Convenient values are: resistor 95=4700 ohms, resistor 90=1 megohm, and condenser 70=0.2 mf. for the condenser and 1 megohm for the resistor 90. This gives a firing pulse of 1 millisecond time constant ($R_{95}\times C_{70}$) and the combination of $R_{90}$ and $C_{70}$ will permit exposing another frame within about one second after the switch 72 is opened. When the tube 91 is a type 2D21, the resistor 93 may have a value of 12,000 ohms.

What is claimed is:

A recording system for recording television images comprising a cathode ray tube and means for causing operation of said tube to produce images, said means including a sync pulse separator, a camera for photographing said images, an electronic counter, means to feed sync pulses to said counter from said sync pulse separator comprising a vacuum tube having at least a cathode, an anode, a control grid, and a screen grid, a gaseous discharge tube, means whereby said gaseous discharge tube varies the voltage applied to said screen grid, means including a connection from said camera whereby said gaseous discharge tube acts normally under control of said camera to control the feeding of sync pulses to said counter, electronic means capable of completing a circuit and being effectively in series with said gaseous discharge tube, means for controlling said electronic means from said counter to interrupt its conductivity and hence the conductivity of said gaseous discharge tube, and additional means for controlling said gaseous discharge tube comprising a manually operable switch connected to said connection from said camera, a resistor and capacitor combination effectively in series with said switch and with a source of D. C. biasing voltage, and a discharge resistor shunting said resistor and capacitor.

HAROLD E. HAYNES.

REFERENCES CITED

The following references are of record in the file of this patent:

UNITED STATES PATENTS

| Number | Name | Date |
|---|---|---|
| 1,979,054 | Scheer | Oct. 30, 1934 |
| 2,148,145 | Ward | Feb. 21, 1939 |
| 2,474,841 | Hatfield | July 5, 1949 |
| 2,493,412 | Lange | Jan. 3, 1950 |
| 2,504,734 | Schmidling | Apr. 18, 1950 |
| 2,509,910 | Dike | May 30, 1950 |
| 2,545,257 | Bryan | Mar. 13, 1951 |
| 2,558,969 | Croy | July 3, 1951 |